United States Patent
Jauhal

(10) Patent No.: US 9,703,618 B1
(45) Date of Patent: Jul. 11, 2017

(54) COMMUNICATION BETWEEN A SOFTWARE PROGRAM THAT USES RPC WITH ANOTHER SOFTWARE PROGRAM USING A DIFFERENT COMMUNICATIONS PROTOCOL ENABLED VIA PROXY

(71) Applicant: EMC Corporation, Hopkinton, MA (US)

(72) Inventor: Shern S. Jauhal, Palo Alto, CA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 677 days.

(21) Appl. No.: 13/930,278

(22) Filed: Jun. 28, 2013

(51) Int. Cl.
*G06F 15/16* (2006.01)
*G06F 9/54* (2006.01)
*H04L 29/06* (2006.01)

(52) U.S. Cl.
CPC .............. *G06F 9/546* (2013.01); *H04L 67/42* (2013.01)

(58) Field of Classification Search
None
See application file for complete search history.

(56) References Cited

U.S. PATENT DOCUMENTS

| | | |
|---|---|---|
| 6,704,886 B1 | 3/2004 | Gill et al. |
| 7,330,997 B1 | 2/2008 | Odom |
| 7,360,110 B1 | 4/2008 | Schmokel et al. |
| 7,523,097 B1 | 4/2009 | Wilson |
| 7,653,714 B2 | 1/2010 | Yagishita |
| 8,260,747 B2 | 9/2012 | Wu et al. |
| 9,201,887 B1 | 12/2015 | Earl et al. |
| 2003/0167408 A1 | 9/2003 | Fitzpatrick et al. |
| 2004/0015578 A1* | 1/2004 | Karakashian ........... H04L 67/02 709/223 |
| 2004/0117548 A1 | 6/2004 | Zamer |
| 2005/0022176 A1* | 1/2005 | Ramachandran ......... G06F 8/65 717/170 |
| 2005/0149577 A1 | 7/2005 | Okada et al. |
| 2005/0216788 A1 | 9/2005 | Mani-Meitav et al. |
| 2006/0010107 A1 | 1/2006 | Nguyen et al. |
| 2006/0242626 A1 | 10/2006 | Pham et al. |
| 2007/0168656 A1 | 7/2007 | Paganetti et al. |

(Continued)

FOREIGN PATENT DOCUMENTS

WO    WO 2014/062191    4/2014

OTHER PUBLICATIONS

NPL—Google English translation of Chinese Application CN101795206 (A)—Aug. 4, 2010.*

(Continued)

*Primary Examiner* — Padma Mundur
(74) *Attorney, Agent, or Firm* — Workman Nydegger

(57) ABSTRACT

One example method includes receiving a message from a first software program using a first communication protocol and identifying a second software program that is an intended recipient of the message. The example method further includes identifying a second communication protocol associated with the intended recipient, where the second communication protocol is incompatible with the first communication protocol such that the first software program and the second software program cannot communicate directly with each other. Finally, the example method includes transmitting the message to the second software program using the second communication protocol.

18 Claims, 3 Drawing Sheets

(56) References Cited

U.S. PATENT DOCUMENTS

| | | | |
|---|---|---|---|
| 2007/0185922 A1 | 8/2007 | Kapoor et al. | |
| 2008/0154989 A1 | 6/2008 | Arman | |
| 2009/0037517 A1 | 2/2009 | Frei | |
| 2009/0164529 A1* | 6/2009 | McCain | G06F 11/1464 |
| 2010/0074147 A1 | 3/2010 | Decasper et al. | |
| 2011/0004629 A1 | 1/2011 | Thorat et al. | |
| 2011/0161465 A1* | 6/2011 | Kowalski | H04L 67/2823 |
| | | | 709/219 |
| 2011/0179415 A1 | 7/2011 | Donnellan et al. | |
| 2012/0079221 A1 | 3/2012 | Sivasubramanian et al. | |
| 2012/0159595 A1 | 6/2012 | Barham | |
| 2012/0233417 A1 | 9/2012 | Kalach et al. | |
| 2013/0061089 A1 | 3/2013 | Valiyaparambil et al. | |
| 2013/0074082 A1 | 3/2013 | Yu | |
| 2014/0019414 A1 | 1/2014 | Abraham et al. | |
| 2014/0082167 A1 | 3/2014 | Robinson et al. | |
| 2014/0089266 A1 | 3/2014 | Une et al. | |
| 2014/0173581 A1 | 6/2014 | Grinberg | |
| 2014/0298490 A1 | 10/2014 | Clark et al. | |
| 2014/0304830 A1 | 10/2014 | Gammon | |
| 2014/0379660 A1 | 12/2014 | Vorsprach et al. | |

OTHER PUBLICATIONS

U.S. Appl. No. 13/931,609, filed Jun. 28, 2013, Jauhal, Shern S.
U.S. Appl. No. 13/927,400, filed Jun. 26, 2013, Jauhal, Shern S.
U.S. Appl. No. 13/927,432, filed Jun. 26, 2013, Jauhal, Shern S.
U.S. Appl. No. 13/927,466, filed Jun. 26, 2013, Jauhal, Shern S.
U.S. Appl. No. 13/930,004, filed Jun. 28, 2013, Jauhal et al.
U.S. Appl. No. 13/931,609, Apr. 1, 2015, Office Action.
U.S. Appl. No. 13/931,609, Oct. 6, 2015, Office Action.
U.S. Appl. No. 13/931,609, May 18, 2016, Final Office Action.
U.S. Appl. No. 13/927,400, Feb. 26, 2016, Office Action.
U.S. Appl. No. 13/927,400, Aug. 11, 2016, Final Office Action.
U.S. Appl. No. 13/927,432, Apr. 6, 2015, Office Action.
U.S. Appl. No. 13/927,432, Oct. 23, 2015, Final Office Action.
U.S. Appl. No. 13/927,432, May 2, 2016, Office Action.
U.S. Appl. No. 13/927,466, Feb. 17, 2016, Office Action.
U.S. Appl. No. 13/930,004, Oct. 28, 2014, Office Action.
U.S. Appl. No. 13/930,004, May 29, 2015, Office Action.
U.S. Appl. No. 13/930,004, Dec. 22, 2015, Final Office Action.
U.S. Appl. No. 13/930,004, Jul. 21, 2016, Office Action.
Ahmad et al., "Survey on secure live virtual machine (VM) migration in Cloud," 2013 2nd National Conference on Information Assurance (NCIA) Year: 2013 pp. 101-106.
Demchenko et al., "Access control infrastructure for on-demand provisioned virtualised infrastructure services," 2011 International Conference on Collaboration Technologies and Systems (CTS) Year: 2011 pp. 466-475.
U.S. Appl. No. 13/931,609, Nov. 23, 2016, Office Action.
U.S. Appl. No. 13/927,432, Nov. 22, 2016, Final Office Action.
U.S. Appl. No. 13/927,466, Nov. 4, 2016, Final Office Action.
U.S. Appl. No. 13/930,004, Dec. 23, 2016, Notice of Allowance.

* cited by examiner

COMMUNICATION BETWEEN A SOFTWARE PROGRAM THAT USES RPC WITH ANOTHER SOFTWARE PROGRAM USING A DIFFERENT COMMUNICATIONS PROTOCOL ENABLED VIA PROXY

FIELD OF THE INVENTION

Embodiments of the present invention generally relate to the implementation of communication between software programs that may have different respective communication protocols. More particularly, embodiments of the invention relate to systems, hardware, computer-readable media, and methods for using a proxy to facilitate communication between software programs that may communicate by way of different respective communication protocols.

BACKGROUND

Software programs sometimes have a need to communicate with other software programs. To this end, a software program typically employs a communication protocol that defines how the software program will communicate with other software programs. Communication between software programs can be effectively implemented so long as both of the software programs are compatible with a common communication protocol. However, problems can arise where, for example, two software programs each employ a different respective communication protocol. This problem can be likened to a situation where two different parties are attempting to communicate with one other, each using its own different language, and without the benefit of a translator.

In practical terms, this problem may require software vendors to implement various communication protocols in their software programs so that those programs can communicate with other software programs. However, it is not always feasible to take this approach due, for example, to cost and/or technical considerations. Moreover, if the particular communication protocol that is needed or desired does not have an implementation in the language and/or operating environment associated with the software program, then that communication protocol cannot be used by the software program to communicate with another software program.

In light of the foregoing, it would be useful to provide a mechanism that would allow, for example, two software programs with different respective associated communication protocols to communicate with each other.

BRIEF DESCRIPTION OF THE DRAWINGS

In order to describe the manner in which at least some of the advantages and features of the invention can be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Figure 1:
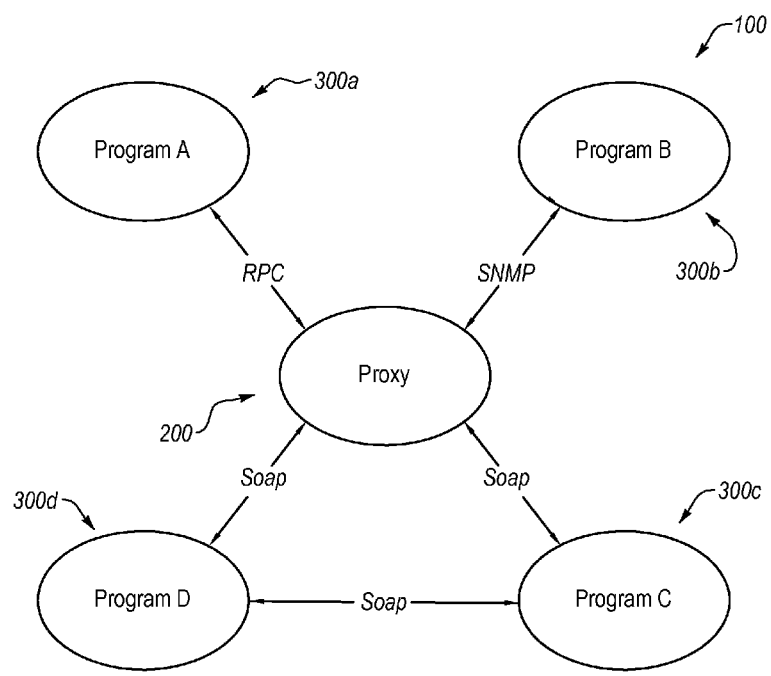
FIG. 1 is a diagram disclosing aspects of an example conceptual proxy configuration.

Embodiments of the invention generally relate to the implementation of communication between software programs that may have different respective communication protocols. More particularly, embodiments of the invention relate to systems, hardware, computer-readable media, and methods for using a proxy to facilitate communication between software programs that may communicate by way of different respective communication protocols.

In at least some embodiments, a proxy, which may be implemented as software, is provided that is positioned between a first software program and a second software program. The proxy implements a first communication protocol utilized by the first software program, and the proxy also implements a second communication protocol that is utilized by the second software program. The first communication protocol has little or no compatibility with the second communication protocol, but the proxy is able to pass messages between the two software programs in forms that each software program can understand.

In terms of its operation, the proxy receives a message from the first software program. That message is received by way of the first communication protocol. The proxy then forwards the message to the second software program using a second communication protocol that is understood by the second software program. Additionally, or alternatively, messages between the software programs can travel in the other direction as well, that is, from the second software program to the first software program, by way of the proxy.

Thus, the proxy may not make any substantial change to the message itself, but instead may only select a particular communication protocol to be used when passing the message from one software program to another software program.

Embodiments of the proxy may support any number of different communication protocols. In the example discussed above, the proxy supports at least two different communication protocols, but other embodiments of the proxy support two, three, or more, communication protocols. To illustrate, one or more example embodiments of the proxy may support communication protocols such as, but not limited to, Open Network Computing Remote Procedure Call (ONC.RPC), Simple Object Access Protocol (SOAP), Representational State Transfer (REST), Simple Network Management Protocol (SNMP), and other communication protocols, and any combination of the foregoing.

Embodiments of the invention may provide various advantages, although it is not necessary, or required, that any particular embodiment(s), provide any particular advantage(s). Moreover, and consistent with the foregoing, embodiments within the scope of one or more claims may additionally, or alternatively, provide one or more advantages not specifically enumerated herein. Finally, to the extent that possible advantages are enumerated herein, those may be present in one or more embodiments in any combination.

Consistent with the foregoing, at least some embodiments of the invention enable disparate software programs that were previously unable to communicate effectively with each other, due to the implementation of different respective communication protocols, to now communicate with each other more easily.

Another useful aspect of some embodiments is that a communication hub may be provided that is able to both receive messages from a variety of software programs using different communication protocols, and to send messages to a variety of software programs using different communication protocols. In this way, the communication hub is able to facilitate communication amongst a multitude of software programs, notwithstanding that those software programs may collectively employ a variety of different communication protocols that are not compatible with each other.

A. Example Proxy Configurations and Functions

The following is a discussion of aspects of some example conceptual arrangements of a proxy, and software programs that communicate with each other by way of the proxy. This discussion is not intended to limit the scope of the invention, or the applicability of the embodiments, in any way.

With particular attention now to FIG. 1, an example proxy configuration 100 is disclosed. In this example, a proxy 200 is configured to facilitate communication between or among a plurality of software programs, such as software programs 300a, 300b, 300c, and 300d, for example. As discussed in more detail elsewhere herein, in some example embodiments, one or more of the programs 300a, 300b, 300c and 300d may constitute a client in a client-server software system, while the server in such a client-server software system acts as the proxy between or among two or more of such programs.

In general, the software programs can be any software programs that have a need to communicate with one or more other software programs. In some example embodiments, one or more of the software programs can be a data backup software program that uses the RPC communication protocol, although the scope of the invention is not limited to this type of program, nor to this particular communication protocol. With continuing reference to FIG. 1, other example embodiments may employ two, three, or more, proxies, where each proxy is configured to facilitate communication between or among two or more software programs.

As indicated in the example proxy configuration 100, each of the software programs 300a, 300b, and 300c may be configured to communicate by way of a different respective communication protocol. In general, the nature of the communication protocols is such that none of the software programs 300a, 300b, and 300c can effectively communicate with any of the other software programs 300a, 300b, and 300c because the respective communication protocols associated with each of the software programs 300a, 300b, and 300c are not compatible with each other.

In the particular example of FIG. 1, which is presented simply for purposes of illustration, software program 300a uses the RPC communication protocol, software program 300b uses the SNMP communication protocol, and software program 300c uses the SOAP communication protocol. Because none of these example communication protocols is compatible with the others, the software programs 300a, 300b, and 300c cannot communicate directly with each other and, therefore, rely on the proxy 200 to facilitate any necessary inter-program communications.

Of course, where two or more software programs employ the same communication protocol, or different but compatible communication protocols, those software programs may communicate directly with each other, bypassing the proxy 200. This point is illustrated by software program 300d which, in this example, employs the SOAP communication protocol. Thus, software programs 300c and 300d can communicate directly with each other, and bypass the proxy 200 for such communications. Where it is necessary for software programs 300c and/or 300d to communicate with software programs 300a and/or 300b, such communications take place by way of the proxy 200, as indicated in FIG. 1.

In some instances, it may not be apparent whether a software program can communicate directly with one or more other software programs. This may occur where, for example, a software program is newly installed. In this circumstance, the newly installed program may attempt to directly communicate with other software programs known to it to reside in the proxy configuration 100 and, if such communication attempts fail, the newly installed software program will direct its communications instead to the proxy 200.

Alternatively, the proxy 200 may be configured so that it becomes aware of a newly installed software program, and the communication protocol associated with the newly installed software program. The proxy 200 may then, based on its awareness of the other communication protocols employed in the proxy configuration 100, determine whether or not the newly installed program will be able to communicate directly with one or more other software programs in the proxy configuration 100. If a determination is made that such communication is not possible, the proxy 200 can communicate to the newly installed software program that the program must communicate by way of the proxy 200. On the other hand, if a determination is made that the newly installed program can communicate directly with one or more other software programs, by virtue of their compatible communication protocols, the proxy 200 can so inform the newly installed software program and that program can communicate with such other programs directly, bypassing the proxy 200.

In this way, the proxy 200 is involved in communications between software programs only where necessitated by incompatible communication protocols of those software programs. This approach may result in a more efficient use of the proxy 200, while reducing processing overhead in the proxy configuration 100.

B. Example Operating Environments

The following is a discussion of aspects of example environments in which embodiments of the invention may be employed. This discussion is not intended to limit the scope of the invention, or the applicability of the embodiments, in any way.

Figure 2:
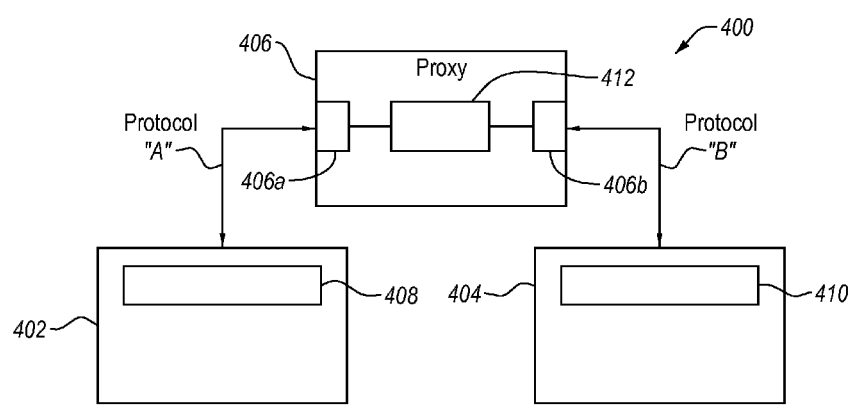
FIG. 2 is a diagram disclosing aspects of an example operating environment for at least some embodiments.

Directing attention now to FIG. 2, details are provided concerning an example operating environment for at least some embodiments. In general, FIG. 2 is directed to a network 400. The network 400 may be, or comprise a portion of, a local area network (LAN), wide area network (WAN), the internet, or any other type of network. In the example of FIG. 2, the network 400 includes one or more clients 402 and 404 that communicate with a server 406. The clients 402 and 404, and server 406, may comprise any type of computing device operable to implement the functionality disclosed herein. Other embodiments may include more than two clients, each operating in connection with a respective communication protocol that may or may not be compatible with the communication protocol(s) of one or more of the other clients.

The client 402 and server 406 collectively implement a client-server software system where software program 408 constitutes a software client that resides on client 402 and communicates with a corresponding server component of the server 406 using communication protocol "A." In some embodiments, the communication protocol "A" is the ONC.RPC communication protocol, although that is not required. The server 406 includes an interface 406A, which may be in the form of software and/or hardware, that is compatible with communication protocol "A."

As further indicated in FIG. 2, software program 410 resides on the client 404. In some cases at least, the software program 410 is a third party program, and the software program 410 may, or may not, be a software client of a client-server software system. Although software program 410 may have a need to communicate with software program 408, the software program 410 communicates by way of communication protocol "B," which is incompatible with the communication protocol "A" employed by software program 408. The server 406 thus further includes a communication interface 406B, which may be in the form of software and/or hardware, that is compatible with communication protocol "B." In some embodiments, the communication protocol "B" is the SNMP communication protocol, although that is not required. More generally, the communication protocols "A" and "B" can be any communication protocols that are incompatible with each other. That is, a software program using communication protocol "A" cannot communicate directly with another software program using communication protocol "B."

By virtue of their incompatible communication protocols, software programs 408 and 410 cannot communicate directly with each other. Thus, in the example of FIG. 2, the server 406 includes a proxy 412, which can take the form of software and/or hardware such as processors and memory, that facilitates communications between the software programs 408 and 410. More specifically, the proxy 412 communicates with communication interfaces 406A and 406B, which can each take the form of hardware such as circuitry and connectors and/or software, and implements at least two different communication protocols in the example of FIG. 2, namely, ONC.RPC and SNMP. Thus, the proxy 412 enables software programs 408 and 410 to send messages to each other, notwithstanding that each of those software programs employs a communication protocol that is incompatible with the communication protocol employed by the other of the software programs. In some instances, the handling of communications that implicate multiple communication protocols, two or more of which may be incompatible with each other, may be allocated amongst two or more proxies, such that no single proxy is responsible for handling all inter-program communications in an environment.

Accordingly, even if the vendors of software programs 408 and 410 do not implement the same communication protocol in each of those software programs, those software programs can still communicate using the proxy 412. Likewise, even if a desired communication protocol does not have an implementation in the language and/or operating environment associated with the software programs, such that an alternative, and incompatible, communication protocol must be employed, the software programs can still communicate with each other using the proxy 412.

C. Operational Aspects of Some Example Embodiments

Figure 3:
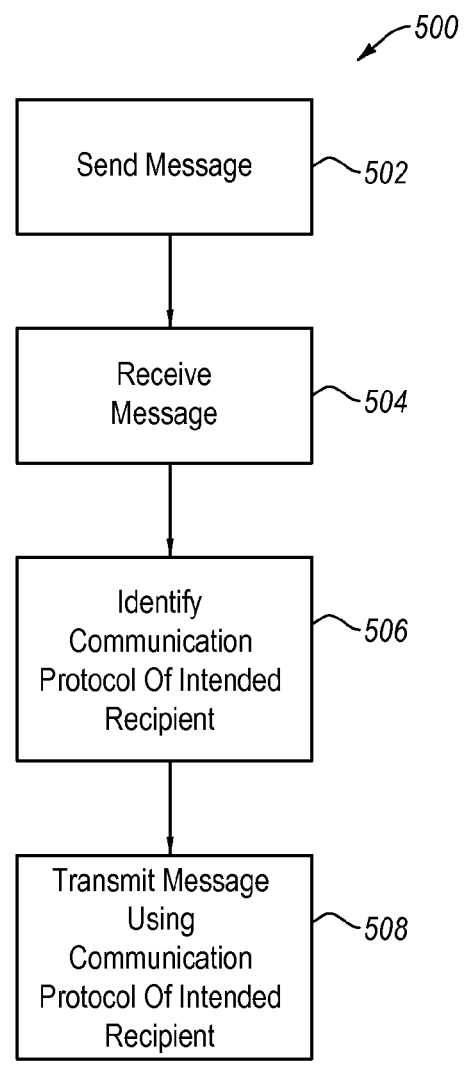
FIG. 3 is a flow diagram disclosing aspects of an example process for using a proxy to facilitate communication between a plurality of software programs.

With attention now to FIG. 3, details are provided concerning some operational aspects of various example embodiments. In particular, an example method 500 is disclosed for enabling communication between software programs that employ incompatible communication protocols. The method 500 begins at 502 where a first software program sends a message, using a first communication protocol, that is intended for a second software program. Because the first and second software programs operate in connection with respective first and second communication protocols that are incompatible with each other, the message cannot be sent directly from the first software program to the second software program.

In one example embodiment, the first communication protocol is the ONC.RPC communication protocol, and the second communication protocol is any communication protocol that is incompatible with ONC.RPC, such as SNMP for example. However, these are presented only by way of example, and various other communication protocols may additionally, or alternatively, be employed.

Accordingly, at 504, a proxy receives the message sent by the first software program using the first communication protocol. The proxy then identifies 506 the second communication protocol associated with the intended recipient, namely, the second software program, of the message sent by the first software program. The proxy then transmits 508 the message received from the first software program to the second software program, using the second communication protocol.

It should be noted that while the process 500 relates to the situation where a message is sent from a first software program to a second software program using a proxy, a similar process can be employed for messages sent from the second software program to the first software program using a proxy. Moreover, a proxy can also be used to enable messages to be sent bi-directionally between the first and second software programs. Further, while the process 500 has been described in terms of the use of two communication protocols, it should be understood that in some instances, more than two communication protocols can be employed by a proxy to facilitate communication between or among multiple software programs, as indicated, for example, in FIG. 1.

With continued reference to the example processes disclosed herein, such as process 500 for example, as well as with reference to proxy configurations and operating environments such as those disclosed herein, it should be noted that communication between software programs by way of a proxy can be either synchronous, or asynchronous. Moreover, in some instances, all communications between a plurality of software programs are synchronous while, in other instances, all communications between a plurality of software programs are asynchronous. In still other circumstances, two or more software programs may use both synchronous communication and asynchronous communication to communicate with each other. Further, synchronous and/or asynchronous communication may be used on an ad hoc basis. As the foregoing examples demonstrate, the scope of the invention is not limited to any particular type of communication in any particular circumstance, proxy configuration, or operating environment.

As used herein, synchronous communication refers to a situation where a first software program sends a message to the proxy and blocks waiting for the return reply from a second software program. On the other hand, asynchronous communication refers to a situation where a first software program sends a message to the proxy and does not block. In this situation, the reply to the message arrives out of band from the original request.

Figure 4:
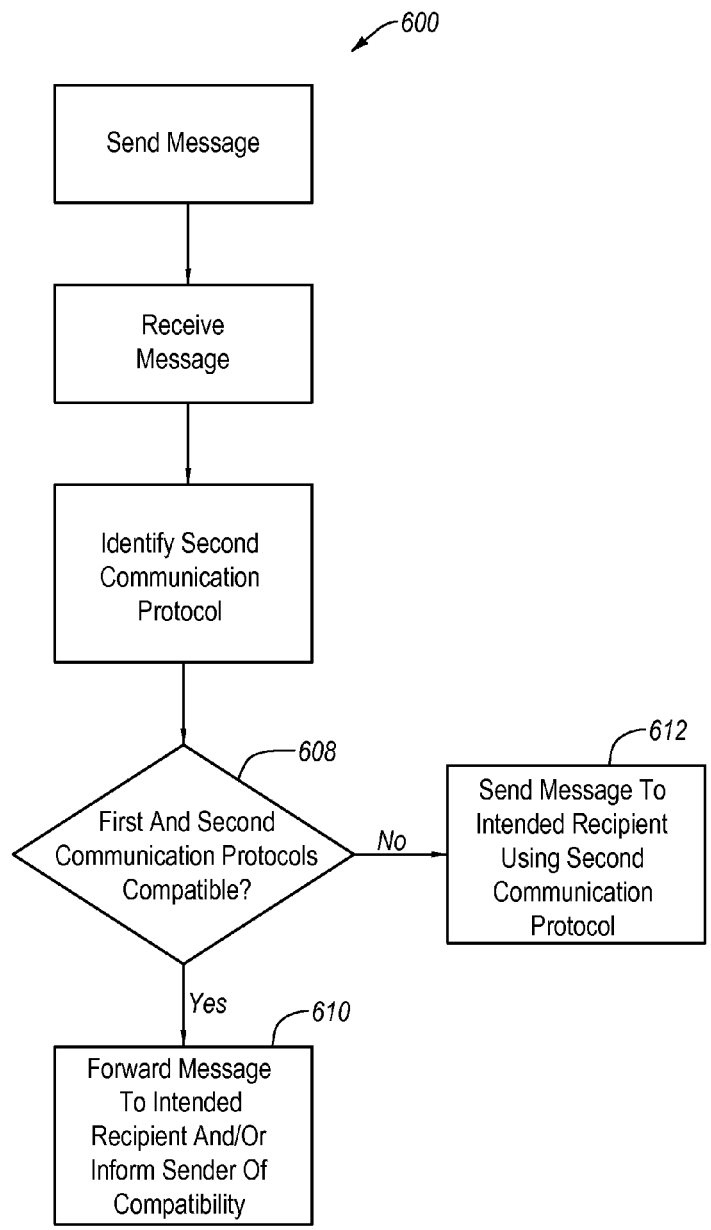
FIG. 4 is a flow diagram disclosing further aspects that can be included in an example process for using a proxy to facilitate communication between a plurality of software programs.

As noted elsewhere herein, some embodiments of the proxy are configured to evaluate whether or not communication protocols, such as the first and second communication protocols addressed in connection with the process 500, are compatible with each other or not. Accordingly, attention is now directed to FIG. 4, which discloses a process 600 wherein the proxy evaluates two or more communication protocols for compatibility with each other. Some or all of the process 600 may be included as part of the process 500.

In general, the process 600 proceeds initially in a manner similar to that of process 500. Thus, at 602, a first software program sends a message, using a first communication protocol, that is intended for a second software program. In one example embodiment, the first communication protocol is the ONC.RPC communication protocol, but various other communication protocols may alternatively be employed.

At 604, a proxy receives the message sent by the first software program using the first communication protocol. The proxy then identifies 606 the second communication protocol associated with the intended recipient, namely, the second software program, of the message sent by the first software program. Next, the proxy compares 608 the first and second communication protocols to determine if they are compatible with each other or not. If the communication protocols are compatible, the proxy may 610 forward the message to the intended recipient software program and/or inform the sending software program of the compatibility so that the sending software program can communicate directly with the intended recipient software program, bypassing the proxy. On the other hand, if the first and second communication protocols are not compatible with each other, the proxy may simply send 612 the message from the first software program to the second software program, using the second communication protocol.

Thus, the process 600 involves the use of the proxy to manage the message traffic that it is requested to handle. In this way, the effectiveness and efficiency of the proxy may be enhanced, since it is only required to handle communications between software programs with incompatible communication protocols. As well, communication between software programs that employ compatible communication protocols may be improved, as a result of bypassing the proxy.

E. Example Computing Devices and Associated Media

The embodiments disclosed herein may include the use of a special purpose or general-purpose computer including various computer hardware or software modules, as discussed in greater detail below. A computer may include a processor and computer-readable media carrying instructions that, when executed by the processor and/or caused to be executed by the processor, perform any one or more of the methods disclosed herein.

As indicated above, embodiments within the scope of the present invention also include computer-readable media for carrying or having computer-executable instructions or data structures stored thereon. Such computer-readable media can be any available media that can be accessed by a general purpose or special purpose computer.

By way of example, and not limitation, such computer-readable media can comprise hardware such as solid state disk (SSD), RAM, ROM, EEPROM, CD-ROM or other optical disk storage, magnetic disk storage or other magnetic storage devices, or any other medium, whether hardware or software, which can be used to carry or store desired program code means in the form of computer-executable instructions or data structures and which can be accessed by a general purpose or special purpose computer. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term "module" or "component" can refer to software objects or routines that execute on the computing system. The different components, modules, engines, and services described herein may be implemented as objects or processes that execute on the computing system, for example, as separate threads. While the system and methods described herein can be implemented in software, implementations in hardware or a combination of software and hardware are also possible and contemplated. In the present disclosure, a 'computing entity' may be any computing system as previously defined herein, or any module or combination of modulates running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention can be performed in client-server environments, whether network or local environments, or in any other suitable environment. Suitable operating environments for at least some embodiments of the invention include cloud computing environments where one or more of a client, server, or target virtual machine may reside and operate in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for communicating between software programs, the method performed in connection with a proxy and comprising:
   detecting the presence, in a proxy configuration that includes a proxy server, of a newly installed software program associated with a particular communication protocol;
   based on awareness of another communication protocol in the proxy configuration, determining if the newly installed software program is able to communicate directly with a second software program in the proxy configuration, wherein either the newly installed software program or the second software program is a client in a client-server software system, and the proxy server is a server in that client-server software system;

when direct communication between the newly installed software program and the second software program is determined not to be possible, directing the newly installed software program to communicate with the second software program by way of the proxy server, and when direct communication between the newly installed software program and the second software program is determined to be possible, directing the newly installed software program to bypass the proxy server and communicate directly with the second software program with which communication has been determined to be possible; and the proxy server performing the following when it is determined that direct communication between the newly installed software program and the second software program is not possible:

receiving, by way of a first communication interface of the proxy server, a message from the newly installed software program using a first communication protocol;

identifying the second software program as the intended recipient of the message;

identifying a second communication protocol associated with the intended recipient, wherein the second communication protocol is incompatible with the first communication protocol such that the newly installed software program and the second software program cannot communicate directly with each other; and transmitting, by way of a second communication interface of the proxy server, the message to the second software program using the second communication protocol.

2. The method as recited in claim 1, wherein the transmission of the message by the newly installed software program is synchronous.

3. The method as recited in claim 1, wherein the transmission of the message by the newly installed software program is asynchronous.

4. The method as recited in claim 1, wherein one of the communication protocols is either the Open Network Computing Remote Procedure Call (ONC.RPC) protocol or the Simple Network Management (SNMP) protocol.

5. The method as recited in claim 1, further comprising comparing the first communication protocol with the second communication protocol to determine if the first communication protocol and the second communication protocol are compatible with each other.

6. The method as recited in claim 1, wherein one of the software programs is a data backup program.

7. A non-transitory storage device having stored therein computer-executable instructions which, when executed by one or more hardware processors of a computing system, implement a method, the method comprising:

detecting the presence, in a proxy configuration that includes a proxy server, of a newly installed software program associated with a particular communication protocol;

based on awareness of another communication protocol in the proxy configuration, determining if the newly installed software program is able to communicate directly with a second software program in the proxy configuration, wherein either the newly installed software program or the second software program is a client in a client-server software system, and the proxy server is a server in that client-server software system;

when direct communication between the newly installed software program and the second software program is determined not to be possible, directing the newly installed software program to communicate with the second software program by way of the proxy server, and when direct communication between the newly installed software program and the second software program is determined to be possible, directing the newly installed software program to bypass the proxy server and communicate directly with the second software program with which communication has been determined to be possible; and the proxy server performing the following when it is determined that direct communication between the newly installed software program and the second software program is not possible:

receiving, by way of a first communication interface of the proxy server, a message from the newly installed software program using a first communication protocol;

identifying the second software program as the intended recipient of the message;

identifying a second communication protocol associated with the intended recipient, wherein the second communication protocol is incompatible with the first communication protocol such that the newly installed software program and the second software program cannot communicate directly with each other; and transmitting, by way of a second communication interface of the proxy server, the message to the second software program using the second communication protocol.

8. The non-transitory storage device as recited in claim 7, wherein the transmission of the message by the newly installed software program is synchronous.

9. The non-transitory storage device as recited in claim 7, wherein the transmission of the message by the newly installed software program is asynchronous.

10. The non-transitory storage device as recited in claim 7, wherein one of the communication protocols is the Open Network Computing Remote Procedure Call (ONC.RPC) protocol.

11. The non-transitory storage device as recited in claim 7, wherein one of the communication protocols is the Simple Network Management (SNMP) protocol.

12. The non-transitory storage device as recited in claim 7, wherein one of the software programs is a data backup program.

13. A proxy server, comprising:

a first communication interface compatible with a first communication protocol;

a second communication interface compatible with a second communication protocol, where the second communication protocol is incompatible with the first communication protocol;

one or more hardware processors; and a non-transitory storage device having stored therein computer-executable instructions which, when executed by the one or more hardware processors, implement a method, the method comprising:

detecting, at the proxy server, the presence of a newly installed software program associated with a particular communication protocol;

based on awareness of another communication protocol in the proxy configuration, determining if the newly installed software program is able to communicate directly with a second software program in the proxy configuration, wherein either the newly installed software program or the second software program is a client in a client-server software system, and the proxy server is a server in that client-server software system;

when direct communication between the newly installed software program and the second software program is determined not to be possible, directing the newly installed software program to communicate with the second software program by way of the proxy server, and when direct communication between the newly installed software program and the second software program is determined to be possible, directing the newly installed software program to bypass the proxy server and communicate directly with the second software program with which communication has been determined to be possible; and the proxy server performing the following when it is determined that direct communication between the newly installed software program and the second software program is not possible:

receiving, by way of the first communication interface, a message from the newly installed software program using the first communication protocol;

identifying the second software program as the intended recipient of the message;

identifying the second communication protocol associated with the intended recipient, wherein the second communication protocol is incompatible with the first communication protocol such that the newly installed software program and the second software program cannot communicate directly with each other; and transmitting, by way of the second communication interface, the message to the second software program using the second communication protocol.

14. The proxy server as recited in claim 13, wherein the method further comprises comparing the first communication protocol with the second communication protocol to determine if the first communication protocol and the second communication protocol are compatible with each other.

15. The proxy server as recited in claim 13, wherein the transmission of the message by the newly installed software program is synchronous.

16. The proxy server as recited in claim 13, wherein the transmission of the message by the newly installed software program is asynchronous.

17. The proxy server as recited in claim 13, wherein one of the communication protocols is either the Open Network Computing Remote Procedure Call (ONC.RPC) protocol or the Simple Network Management (SNMP) protocol.

18. The proxy server as recited in claim 13, wherein one of the software programs is a data backup program.

* * * * *